(12) United States Patent
Lee

(10) Patent No.: US 7,028,125 B2
(45) Date of Patent: Apr. 11, 2006

(54) HOT-PLUGGABLE PERIPHERAL INPUT DEVICE COUPLING SYSTEM

(75) Inventor: Chun-Liang Lee, Taipei (TW)

(73) Assignee: Inventec Corporation, (TW)

( * ) Notice: Subject to any disclaimer, the term of this patent is extended or adjusted under 35 U.S.C. 154(b) by 243 days.

(21) Appl. No.: 10/633,891

(22) Filed: Aug. 4, 2003

(65) Prior Publication Data

US 2005/0033890 A1    Feb. 10, 2005

(51) Int. Cl.
  *G06F 13/00*    (2006.01)
(52) U.S. Cl. .......................... 710/300; 714/44
(58) Field of Classification Search ................ 710/100, 710/300–304, 316; 714/1, 43, 44, 47, 56
See application file for complete search history.

(56) References Cited

U.S. PATENT DOCUMENTS

| | | | | |
|---|---|---|---|---|
| 5,222,228 A | * | 6/1993 | Asprey ........................... 713/1 |
| 5,822,512 A | * | 10/1998 | Goodrum et al. ............. 714/13 |
| 5,834,856 A | * | 11/1998 | Tavallaei et al. ............... 307/64 |
| 5,898,861 A | * | 4/1999 | Emerson et al. ............... 703/23 |
| 6,363,452 B1 | * | 3/2002 | Lach ........................... 710/316 |
| 6,516,367 B1 | * | 2/2003 | Barenys et al. ............. 710/109 |
| 2004/0088464 A1 | * | 5/2004 | Parameswaran ............ 710/302 |
| 2005/0050272 A1 | * | 3/2005 | Behrens et al. ............. 711/114 |

* cited by examiner

*Primary Examiner*—Khanh Dang
(74) *Attorney, Agent, or Firm*—Fulbright & Jaworski LLP

(57) ABSTRACT

A hot-pluggable peripheral input device coupling system is proposed, which is designed for use to couple one or more peripheral input devices, such as a keyboard and a mouse, to a network server, such as a blade server, for the purpose of allowing the user to input data and commands to the blade server via the keyboard and mouse. The proposed hot-pluggable peripheral input device coupling system is characterized by the provision of at least two management control modules with one serving as a redundant backup module to the other so that in the event of a failure to the active one, the blade server can nevertheless be functionally linked to the externally connected keyboard and mouse via the redundant backup module. The invention can therefore help enhance the efficiency of network system management on blade servers.

11 Claims, 2 Drawing Sheets

HOT-PLUGGABLE PERIPHERAL INPUT DEVICE COUPLING SYSTEM

BACKGROUND OF THE INVENTION

1. Field of the Invention

This invention relates to computer peripheral technology, and more particularly, to a hot-pluggable peripheral input device coupling system, which is designed for use to couple one or more peripheral input devices, such as a keyboard and a mouse that are connected together to a PS/2 connector, to a network server platform, such as a blade server, for the purpose of allowing the user to input data and commands to the blade server via the keyboard and the mouse.

2. Description of Related Art

Blade server is a clustering type of network server, which is characterized by the use of a circuit board enclosure to integrate a cluster of server modules (commonly called "blades"), with all of these server modules providing the same server functionality. In other words, a blade server can respond to a client's request by linking any one of the clustered server modules to the client. In practice, each server module is embodied as a single circuit board (i.e., blade), which can be easily fitted to the blade server's enclosure to increase the blade server's client serving capacity.

A computer platform is typically equipped with a dedicated set of peripheral input devices, such as keyboard and mouse, which allow the user to input data and commands to the computer platform to perform such tasks as system updates, file maintenance, hardware/software testing, and so on. In network applications, blade servers are used as Web servers, file servers, E-mail servers, and so on. In such applications, since peripheral input devices are required only in the setup stage and are unnecessary during the server operation, keyboard and mouse are typically removed to save equipment cost and room space. For this sake, blade servers are typically unequipped with keyboard and mouse during operation, and keyboard and mouse are externally coupled to blade servers only when it is necessary to perform system updates, file maintenance, or hardware/software testing on the blade servers.

One drawback to conventional keyboard/mouse coupling systems on blade servers, however, is that each system is provided with only one management control module, and therefore in the event of a failure to the management control module, it would cause the keyboard and mouse unable to be functionally linked to the blade server. Moreover, conventional keyboard/mouse coupling systems for blade servers typically have no hot-plug capabilities, and therefore are inconvenient to use.

SUMMARY OF THE INVENTION

It is therefore an objective of this invention to provide a hot-pluggable peripheral input device coupling system that is equipped with at least two management control modules with one serving as a redundant backup module to the other so that in the event of a failure to the active one, the blade server can nevertheless be functionally linked to the externally connected keyboard and mouse via the redundant backup module.

It is another objective of this invention to provide a hot-pluggable peripheral input device coupling system that has a hot-plug capability to allow external keyboard and mouse to be plugged to the blade server while the blade server is in active operation.

The hot-pluggable peripheral input device coupling system according to the invention is designed for use to couple one or more peripheral input devices, such as a keyboard and a mouse, to a network server, such as a blade server, for the purpose of allowing the user to input data and commands to the blade server via the keyboard and the mouse.

The hot-pluggable peripheral input device coupling system according to the invention is characterized by the provision of at least two management control modules with one serving as a redundant backup module to the other so that in the event of a failure to the active one, the blade server can nevertheless be functionally linked to the externally connected keyboard and mouse via the redundant backup module. The invention can therefore help enhance the efficiency of network system management on blade servers.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The hot-pluggable peripheral input device coupling system according to the invention is disclosed in full details by way of preferred embodiments in the following with reference to the accompanying drawings.

Figure 1:
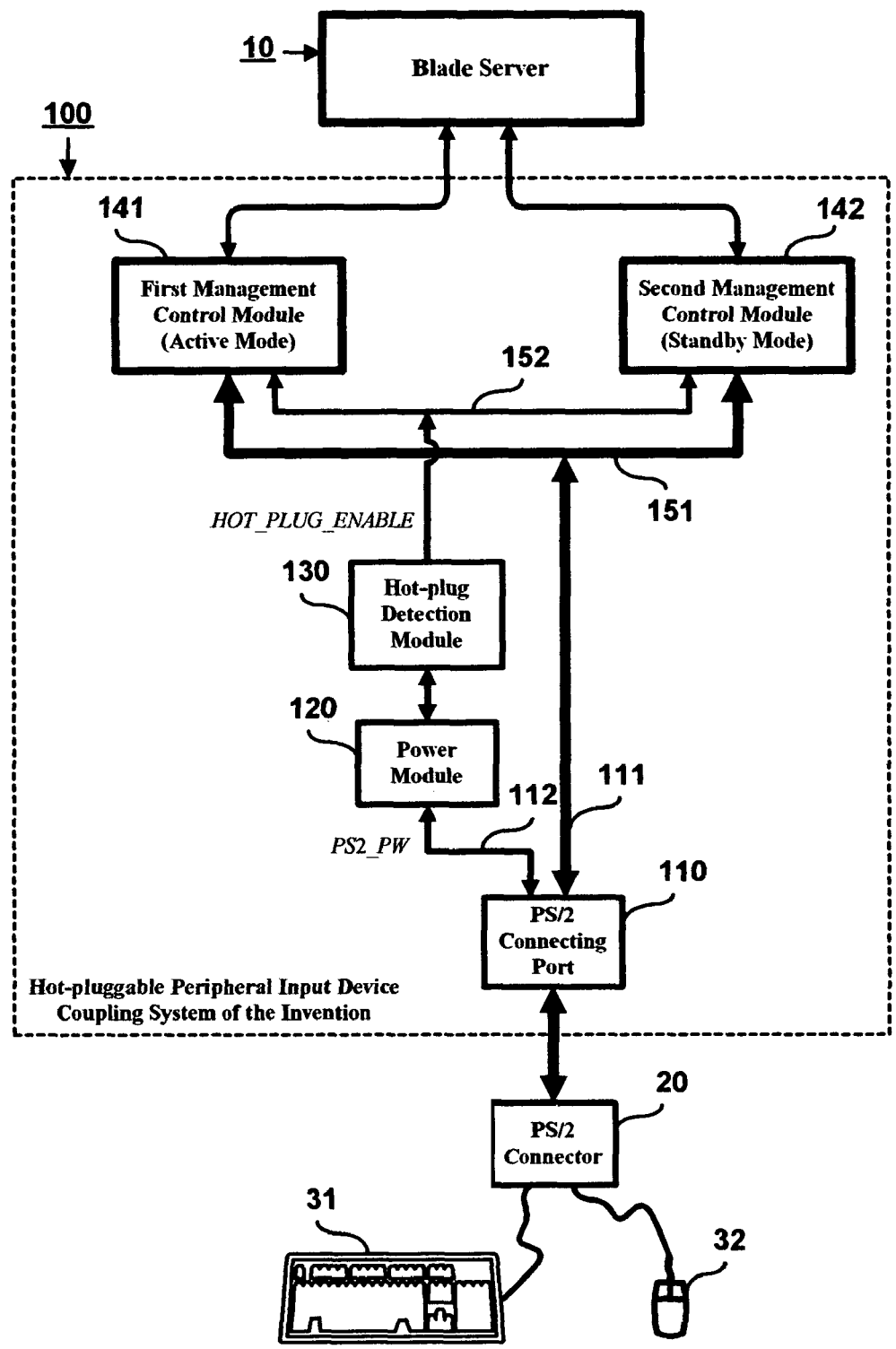
FIG. 1 is a schematic block diagram showing the object-oriented component model of the hot-pluggable peripheral input device coupling system according to the invention.

FIG. 1 is a schematic block diagram showing the object-oriented component model of the hot-pluggable peripheral input device coupling system according to the invention (as the part enclosed in the dotted box indicated by the reference numeral 100). As shown, in application, the hot-pluggable peripheral input device coupling system of the invention 100 is integrated to a network serer platform, such as a blade server 10, for the purpose of allowing one or more peripheral input devices, such as a keyboard 31 and a mouse 32 (which are connected together to a specific type of input connector, such as a PS/2 connector 20), to be functionally linked to the blade server 10 by hot-plugging to thereby allow the user to use the keyboard 31 and the mouse 32 to input data and commands to the blade server 10.

The hot-pluggable peripheral input device coupling system of the invention 100 comprises: (a) a connecting port 110; (b) a power module 120; (c) a hot-plug detection module 130; and (d) at least two management control modules, including a first management control module 141 and a second management control module 142.

The connecting port 110 is compatible to the PS/2 connector 20 so that the PS/2 connector 20 can be plugged thereto, and which is designed to bifurcate the data lines 111 of the PS/2 connector 20 to a shared data bus 151 that is connected to both the first management control module 141 and the second management control module 142, and further bifurcate the power lines 112 of the PS/2 connector 20 to the power module 120.

The power module 120 has an output end PS2_PW connected to the bifurcated power lines 112 of the PS/2 connector 20 from the connecting port 110, and which is used for supplying a power voltage PS2_PW via the power lines 112 of the PS/2 connector 20 to the keyboard 31 and the mouse 32.

The hot-plug detection module 130 is coupled to the power module 120, and which is capable of generating a hot-plug enable signal HOT_PLUG_ENABLE in the event of the output end PS2_PW of the power module 120 being electrically connected to the keyboard 31 and the mouse 32 via the power lines 112 of the PS/2 connector 20. The hot-plug enable signal HOT_PLUG_ENABLE can be, for example, a logic-high voltage signal or a logic-low voltage signal, and which is transferred by the hot-plug detection module 130 via a shared signal line 152 to the active one of the first management control module 141 and the second management control module 142 (i.e., the one that is currently in active mode of operation).

Figure 2:
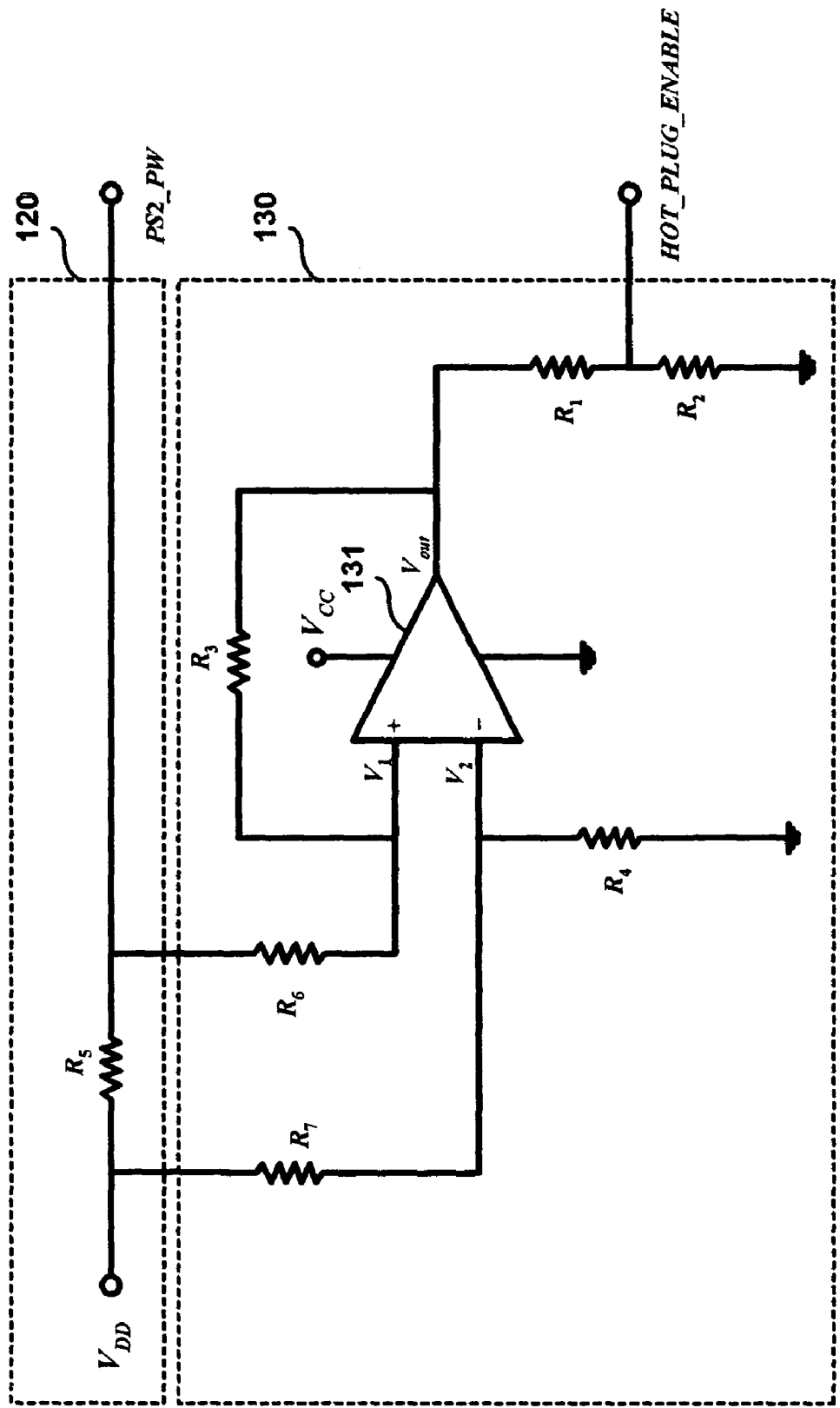
FIG. 2 is a schematic circuit diagram showing the internal circuit architecture of a power module and a hot-plug detection module that are constituent components of the hot-pluggable peripheral input device coupling system according to the invention.

FIG. 2 is a schematic circuit diagram showing a preferred embodiment of the internal circuit architecture of the power module 120 and the hot-plug detection module 130. As shown, the circuit architecture of the power module 120 and the hot-plug detection module 130 includes an operational amplifier 131, a plurality of resistors $R_1$, $R_2$, $R_3$, $R_4$, $R_5$, $R_6$, $R_7$, and a power source $V_{DD}$; wherein the power source $V_{DD}$ and the resistor $R_5$ constitute the power module 120, while the operational amplifier 131 and the other resistors $R_1$, $R_2$, $R_3$, $R_4$, $R_6$, $R_7$, constitute the hot-plug detection module 130. The operational amplifier 131 has a positive input end ($V_1$), a negative input end ($V_2$), and an output end ($V_{out}$), wherein the positive input end ($V_1$) and the negative input end ($V_2$) are respectively electrically connected to the two ends of the resistor $R_5$ in the power module 120 to detect the potential drop across the resistor $R_5$. When the output end PS2_PW of the power module 120 is open-circuited (i.e., electrically disconnected), it will cause $V_1=V_2$ at the positive input end ($V_1$) and the negative input end ($V_2$) of the operational amplifier 131, thereby causing the output end ($V_{out}$) to output a logic-high voltage signal (representing HOT_PLUG_ENABLE=0); and when the output end PS2_PW of the power module 120 is electrically connected to the keyboard 31 and the mouse 32, it will cause $V_1<V_2$ at the positive input end ($V_1$) and the negative input end ($V_2$) of the operational amplifier 131, thereby causing the output end ($V_{out}$) to output a logic-low voltage signal (representing HOT_PLUG_ENABLE=1). It is to be noted that the circuit architecture shown in FIG. 2 is only one of many possible embodiments of the power module 120 and the hot-plug detection module 130. Various other different circuit architectures can be designed to implement the functionality of the power module 120 and the hot-plug detection module 130.

The first management control module 141 and the second management control module 142 are both used to control the input of data and commands from the keyboard 31 and the mouse 32 to the blade server 10. In practice, only one of these two management control modules (141 or 142) is preset to active mode, and the other is preset to standby mode; for example, in the embodiment of FIG. 1, the first management control module 141 is preset to active mode whereas the second management control module 142 is preset to standby mode to serve as a redundant backup module to the first management control module 141 such that in the event of a failure to the first management control module 141, the second management control module 142 will be promptly switched to active mode to take over the tasks that are previously performed by the first management control module 141. The active management control module (141 or 142) will respond to the hot-plug enable signal HOT_PLUG_ENABLE from the hot-plug detection module 130 to perform a keyboard/mouse initialization procedure for the keyboard 31 and the mouse 32 to thereby allow the blade server 10 to be functionally linked to the keyboard 31 and the mouse 32 and thereby capable of receiving and processing data and commands from the keyboard 31 and the mouse 32.

In application, the user needs first to connect the keyboard 31 and the mouse 32 together to the PS/2 connector 20, and then plug the PS/2 connector 20 to the connecting port 110. When the PS/2 connector 20 is plugged in position to the connecting port 110, it allows the power lines 112 of the PS/2 connector 20 to be electrically connected to the power module 120, thereby allowing the power module 120 to supply power to the keyboard 31 and the mouse 32. When the power module 120 is electrically connected to the keyboard 31 and the mouse 32, it will cause the hot-plug detection module 130 to generate a hot-plug enable signal HOT_PLUG_ENABLE and send it via the shared signal line 152 to the two management control modules 141, 142. The one of these two management control modules 141, 142 that is currently in active mode will respond to the hot-plug enable signal HOT_PLUG_ENABLE from the hot-plug detection module 130 to perform a device initialization procedure for the keyboard 31 and the mouse 32 to allow the blade server 10 to be functionally linked to the keyboard 31 and the mouse 32 and thereby capable of receiving and processing data and commands from the keyboard 31 and the mouse 32.

During the input of data and commands from the keyboard 31 and mouse 32 to the blade server 10, if the first management control module 141 (which is preset to active mode) fails, the second management control module 142 (which is preset to standby mode) will be promptly switched to active mode to thereby take over the tasks that are previously performed by the first management control module 141, allowing the blade server 10 to be nevertheless functionally linked to the keyboard 31 and the mouse 32 via the second management control module 142.

In conclusion, the invention provides a hot-pluggable peripheral input device coupling system which is designed for use to couple one or more peripheral input devices, such as a keyboard and a mouse, to a network server, such as a blade server, for the purpose of allowing the user to input data and commands to the blade server via the keyboard and mouse; and which is characterized by the provision of at least two management control modules with one serving as a redundant backup module to the other so that in the event of a failure to the active one, the blade server can nevertheless be functionally linked to the externally connected keyboard and mouse via the redundant backup module. The invention can therefore help enhance the efficiency of network system management on blade servers.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A hot-pluggable peripheral input device coupling system for coupling one or more peripheral input devices to a server platform, with the peripheral input devices being connected to a specific type of input connector having a set of power lines and a set of data lines, for the purpose of allowing the peripheral input devices to input data and commands to the server platform;

the hot-pluggable peripheral input device coupling system comprising:

a connecting port, which is pluggable to the input connector, and which bifurcates the power lines and the data lines of the input connector;

a power module, which is coupled via the connecting port to the power lines of the input connector for supplying power to the peripheral input devices;

a hot-plug detection module, which is coupled to the power module, and which is capable of generating a hot-plug enable signal in the event of the power module being electrically connected to the peripheral input devices; and at least two management control modules, including a first management control module and a second management control module;

wherein the first management control module is preset to active mode while the second management control module is preset to standby mode to serve as a redundant backup module to the first management control module such that in the event of a failure to the first management control module, the second management control module will be promptly switched to active mode;

and wherein the one of the first management control module and the second management control module that is currently in active mode will respond to the hot-plug enable signal from the hot-plug detection module to perform an initialization procedure for the peripheral input devices to allow the server platform to be functionally linked to the peripheral input devices.

2. The hot-pluggable peripheral input device coupling system of claim 1, wherein the server platform is a blade server.

3. The hot-pluggable peripheral input device coupling system of claim 1, wherein the peripheral input devices include a keyboard and a mouse.

4. The hot-pluggable peripheral input device coupling system of claim 1, wherein the input connector a PS/2 connector.

5. The hot-pluggable peripheral input device coupling system of claim 1, wherein the hot-plug detection module includes:

an operational amplifier, which has a positive input end, a negative input end, and an output end; wherein the positive input end and the negative input end are connected to detect a potential drop in the power module when the power module is electrically connected to the peripheral input devices to thereby generating an electrical voltage representing the hot-plug enable signal.

6. A hot-pluggable peripheral input device coupling system for coupling one or more peripheral input devices to a blade server, with the peripheral input devices being connected to a specific type of input connector having a set of power lines and a set of data lines, for the purpose of allowing the peripheral input devices to input data and commands to the blade server;

the hot-pluggable peripheral input device coupling system comprising:

a connecting port, which is pluggable to the input connector, and which bifurcates the power lines and the data lines of the input connector;

a power module, which is coupled via the connecting port to the power lines of the input connector for supplying power to the peripheral input devices;

a hot-plug detection module, which is coupled to the power module, and which is capable of generating a hot-plug enable signal in the event of the power module being electrically connected to the peripheral input devices; and at least two management control modules, including a first management control module and a second management control module;

wherein the first management control module is preset to active mode while the second management control module is preset to standby mode to serve as a redundant backup module to the first management control module such that in the event of a failure to the first management control module, the second management control module will be promptly switched to active mode;

and wherein the one of the first management control module and the second management control module that is currently in active mode will respond to the hot-plug enable signal from the hot-plug detection module to perform an initialization procedure for the peripheral input devices to allow the blade server to be functionally linked to the peripheral input devices.

7. The hot-pluggable peripheral input device coupling system of claim 6, wherein the peripheral input devices include a keyboard and a mouse.

8. The hot-pluggable peripheral input device coupling system of claim 6, wherein the input connector a PS/2 connector.

9. The hot-pluggable peripheral input device coupling system of claim 6, wherein the hot-plug detection module includes:

an operational amplifier, which has a positive input end, a negative input end, and an output end; wherein the positive input end and the negative input end are connected to detect a potential drop in the power module when the power module is electrically connected to the peripheral input devices to thereby generating an electrical voltage representing the hot-plug enable signal.

10. A hot-pluggable peripheral input device coupling system for coupling a keyboard and a mouse to a blade server, with the keyboard and the mouse being connected to a PS/2 connector having a set of power lines and a set of data lines, for the purpose of allowing the keyboard and the mouse s to input data and commands to the blade server;

the hot-pluggable peripheral input device coupling system comprising:

a PS/2 connecting port, which is pluggable to the PS/2 connector, and which bifurcates the power lines and the data lines of the PS/2 connector;

a power module, which is coupled via the connecting port to the power lines of the PS/2 connector for supplying power to the keyboard and the mouse;

a hot-plug detection module, which is coupled to the power module, and which is capable of generating a hot-plug enable signal in the event of the power module being electrically connected to the keyboard and the mouse; and at least two management control modules, including a first management control module and a second management control module;

wherein the first management control module is preset to active mode while the second management control module is preset to standby mode to serve as a redundant backup module to the first management control module such that in the event of a failure to the first management control module, the second management control module will be promptly switched to active mode;

and wherein the one of the first management control module and the second management control module that is currently in active mode will respond to the hot-plug enable signal from the hot-plug detection module to perform an initialization procedure for the keyboard and the mouse to allow the blade server to be functionally linked to the keyboard and the mouse.

11. The hot-pluggable peripheral input device coupling system of claim 10, wherein the hot-plug detection module includes:

an operational amplifier, which has a positive input end, a negative input end, and an output end; wherein the positive input end and the negative input end are connected to detect a potential drop in the power module when the power module is electrically connected to the keyboard and the mouse to thereby generating an electrical voltage representing the hot-plug enable signal.

* * * * *